United States Patent
Zhang

(10) Patent No.: US 8,981,943 B2
(45) Date of Patent: Mar. 17, 2015

(54) WIRELESS TEMPERATURE MEASURING SYSTEM

(75) Inventor: Changhuan Zhang, Wuhan (CN)

(73) Assignees: Wuhan Amate Technology Co., Ltd., Wuhan (CN); AMT Wireless Europe, Louvain-la-Neuve (BE)

( * ) Notice: Subject to any disclaimer, the term of this patent is extended or adjusted under 35 U.S.C. 154(b) by 1060 days.

(21) Appl. No.: 12/953,428

(22) Filed: Nov. 23, 2010

(65) Prior Publication Data

US 2011/0115636 A1  May 19, 2011

Related U.S. Application Data

(63) Continuation of application No. PCT/CN2010/076666, filed on Sep. 7, 2010.

(30) Foreign Application Priority Data

Nov. 16, 2009 (CN) ............ 2009 2 0229807 U

(51) Int. Cl.
*G08B 17/00* (2006.01)
*H04Q 9/00* (2006.01)
*G01K 1/02* (2006.01)

(52) U.S. Cl.
CPC ............ *H04Q 9/00* (2013.01); *G01K 1/024* (2013.01); *H04Q 2209/40* (2013.01); *H04Q 2209/823* (2013.01)
USPC ............ 340/584; 340/540; 455/450

(58) Field of Classification Search
CPC ....... H04N 5/907; H04N 5/765; H04N 5/772; H04N 5/9201; H04N 5/77; G07C 1/22; G07C 11/00; G07C 2011/04
See application file for complete search history.

(56) References Cited

U.S. PATENT DOCUMENTS

| | | | |
|---|---|---|---|
| 6,300,871 B1 * | 10/2001 | Irwin et al. | 340/539.28 |
| 2005/0113647 A1 * | 5/2005 | Lee et al. | 600/300 |
| 2006/0145881 A1 * | 7/2006 | Sakatani et al. | 340/679 |
| 2006/0229041 A1 * | 10/2006 | Ninomiya et al. | 455/196.1 |
| 2008/0278316 A1 * | 11/2008 | Kates | 340/539.22 |
| 2009/0279529 A1 * | 11/2009 | Hamalainen et al. | 370/350 |
| 2010/0161630 A1 * | 6/2010 | Moriwaki et al. | 707/758 |
| 2010/0238019 A1 * | 9/2010 | Richman et al. | 340/521 |
| 2010/0266058 A1 * | 10/2010 | Murakami | 375/260 |

* cited by examiner

*Primary Examiner* — Tai T Nguyen
*Assistant Examiner* — Ojiako Nwugo
(74) *Attorney, Agent, or Firm* — Matthias Scholl P.C.; Matthias Scholl

(57) ABSTRACT

A wireless temperature measuring system, including multiple wireless temperature sensors, and multiple communication terminals; the wireless temperature sensors communicate with the communication terminals via RF, the wireless temperature sensor operates to obtain temperature signals from a temperature detection point, to perform cross-interleaved error correction encoding on the temperature signals whereby obtaining coded temperature signals, and to transmit the coded temperature signals to the communication terminals via RF; the communication terminal operates to receive and decode the coded temperature signals from the wireless temperature sensor, and to obtain decoded temperature signals.

2 Claims, 7 Drawing Sheets

WIRELESS TEMPERATURE MEASURING SYSTEM

CROSS-REFERENCE TO RELATED APPLICATIONS

This application is a continuation of International Patent Application No. PCT/CN2010/076666 with an international filing date of Sep. 7, 2010, designating the United States, now pending, and further claims priority benefits to Chinese Patent Application No. 200920229807.7 filed on Nov. 16, 2009. The contents of all of the aforementioned applications, including any intervening amendments thereto, are incorporated herein by reference.

BACKGROUND OF THE INVENTION

1. Field of the Invention

The invention relates to a wireless temperature measuring system.

2. Description of the Related Art

Temperature is an important measuring parameter in many fields such as industry, military, electric power and so on. Conventional methods for measuring temperature include: 1) a field bus measuring method: multiple temperature probes are disposed at each temperature detection point, a field bus is connected to a programmable logic controller (PLC) whereby reading temperature at each temperature detection point; 2) an infrared measuring method: users hold an infrared detector to detect temperature of each temperature detection point. However, there are several problems with the conventional methods: firstly, the field bus measuring method requires in-situ cable laying, which features complex installation and inconvenient extension, and remote monitoring cannot be facilitated; secondly, the infrared measuring method is easily affected by sunshine or illumination and requires field debugging, and remote monitoring cannot be facilitated.

SUMMARY OF THE INVENTION

In view of the above-described problem, it is one objective of the invention to provide a wireless temperature measuring system that is capable of addressing the above-mentioned problems.

To achieve the above objectives, in accordance with one embodiment of the invention, provided is a wireless temperature measuring system, comprising multiple wireless temperature sensors, and multiple communication terminals, the wireless temperature sensors communicate with the communication terminals via RF, the wireless temperature sensor operates to obtain temperature signals from a temperature detection point, to perform cross-interleaved error correction encoding on the temperature signals whereby obtaining coded temperature signals, and to transmit the coded temperature signals to the communication terminals via RF, the communication terminal operates to receive and decode the coded temperature signals from the wireless temperature sensor, and to obtain decoded temperature signals.

In a class of this embodiment, the wireless temperature sensor comprises a temperature collection module, an analog/digital (A/D) conversion module, a first micro-controller unit (MCU) module, and a first RF module.

In a class of this embodiment, the temperature collection module operates to collect temperature of the temperature detection point whereby obtaining an analog temperature signal, to transmit the analog temperature signal to the A/D conversion module, and to transmit an ID number of the temperature collection module to the first MCU module, the A/D conversion module operates to receive the analog temperature signal from the temperature collection module, to perform A/D conversion on the analog temperature signal whereby obtaining a digital temperature signal, and to transmit the digital temperature signal to the first MCU module, the first MCU module operates to receive the digital temperature signal from the A/D conversion module, and the ID number of the temperature collection module from the temperature collection module, to pack the digital temperature signal and the ID number of the temperature collection module with data frames whereby obtaining a temperature signal data packet, to perform cross-interleaved error correction encoding on the temperature signal data packet whereby obtaining a coded temperature signal, and to transmit the coded temperature signal to the first RF module, and the first RF module operates to receive the coded temperature signal from the first MCU module, and to transmit the coded temperature signal to the communication terminal.

In a class of this embodiment, the communication terminal comprises a second RF module, a second MCU module, and a display module.

In a class of this embodiment, the second RF module operates to receive the coded temperature signal from the first RF module, and to transmit the coded temperature signal to the second MCU module, the second MCU module operates to receive the coded temperature signal from the second RF module, to decode the coded temperature signal whereby obtaining a decoded temperature signal, and to transmit the decoded temperature signal to the display module, and the display module operates to receive and to display the decoded temperature signal from the second MCU module.

In a class of this embodiment, the first MCU module further operate to detect whether a RF signal exists at a main frequency point of the first RF module after receiving the coded temperature signal, to transmit the coded temperature signal to the first RF module and to inform the first RF module to transmit the coded temperature signal via the main frequency point if no RF signal exists at a main frequency point of the first RF module, or to transmit the coded temperature signal to the first RF module and to inform the first RF module to transmit the coded temperature signal via an auxiliary frequency point if the RF signal exists at a main frequency point of the first RF module.

In a class of this embodiment, the first RF module further operates to transmit the coded temperature signal to the communication terminal via the main frequency point if no RF signal exists at a main frequency point of the first RF module, or to transmit the coded temperature signal to the communication terminal via the auxiliary frequency point if the RF signal exists at a main frequency point of the first RF module.

In a class of this embodiment, the second MCU module further operates to set values of the main frequency point and the auxiliary frequency point, to pack the values of the main frequency point and the auxiliary frequency point with data frames whereby obtaining a frequency point packet, to perform cross-interleaved error correction encoding on the frequency point packet whereby obtaining a coded frequency point, and to transmit the coded frequency point to the second RF module, the second RF module further operates to receive the coded frequency point from the second MCU module, and to transmit the coded frequency point to the first RF module via RF, the first RF module further operates to receive the coded frequency point from the second RF module, and to transmit the coded frequency point to the first MCU module, and the first MCU module further operates to receive the coded frequency point from the first RF module, to decode the coded frequency point whereby obtaining values of the main frequency point and the auxiliary frequency point, and to set the main frequency point and the auxiliary frequency point of the first RF module.

In a class of this embodiment, the first MCU module further operates to detect whether the digital temperature signal matches an alarm temperature signal condition after receiving the digital temperature signal, to pack the digital temperature signal and the ID number of the temperature collection module with data frames whereby obtaining a normal temperature signal packet, to perform cross-interleaved error correction encoding on the normal temperature signal packet whereby obtaining a coded normal temperature signal, and to transmit the coded normal temperature signal to the first RF module if the digital temperature signal does not meet an alarm temperature signal condition, or to pack the digital temperature signal, the ID number of the temperature collection module, and a temperature alarm ID with data frames whereby obtaining an alarm temperature signal packet, to perform cross-interleaved error correction encoding on the alarm temperature signal packet whereby obtaining a coded alarm temperature signal, and to transmit the coded alarm temperature signal to the first RF module if the digital temperature signal matches an alarm temperature signal condition, and the first RF module further operates to receive the coded normal temperature signal from the MCU module, and to transmit the coded normal temperature signal to the communication terminal via RF if the digital temperature signal does not meet an alarm temperature signal condition, or to receive the coded alarm temperature signal from the first MCU module, and to transmit the coded alarm temperature signal to the communication terminal via RF if the digital temperature signal matches an alarm temperature signal condition.

In a class of this embodiment, the communication terminal further comprises an alarm module, the second RF module further operates to receive the normal temperature signal from the first RF module, and to transmit the normal temperature signal to the second MCU module if the digital temperature signal does not meet an alarm temperature signal condition, or to receive the alarm temperature signal from the first RF module, and to transmit the alarm temperature signal to the second MCU module if the digital temperature signal matches an alarm temperature signal condition, the second MCU module further operates to receive the normal temperature signal from the second RF module, to decode the normal temperature signal whereby obtaining a decoded normal temperature signal, and to transmit the decoded normal temperature signal to the display module if the digital temperature signal does not meet an alarm temperature signal condition, or to receive the alarm temperature signal from the second RF module, to decode the alarm temperature signal whereby obtaining a decoded alarm temperature signal, to transmit the decoded alarm temperature signal to the display module, and to inform the alarm module to send an alarm if the digital temperature signal matches an alarm temperature signal condition, and the display module further operates to receive and to display the decoded normal temperature signal from the second MCU module if the digital temperature signal does not meet an alarm temperature signal condition, or to receive and to display the decoded alarm temperature signal from the second MCU module if the digital temperature signal matches an alarm temperature signal condition.

In a class of this embodiment, the second MCU module further operates to set the alarm temperature signal condition and a reporting period thereof, to pack the alarm temperature signal condition and the reporting period thereof with data frames whereby obtaining an alarm temperature signal condition packet, and a reporting period packet, to perform cross-interleaved error correction encoding on the alarm temperature signal condition packet and the reporting period packet whereby obtaining a coded alarm temperature signal condition and a coded reporting period, and to transmit the coded alarm temperature signal condition and the coded reporting period to the second RF module, the second RF module further operates to receive the coded alarm temperature signal condition and the coded reporting period from the second MCU module, and to transmit the coded alarm temperature signal condition and the coded reporting period to the first RF module, the first RF module further operates to receive the coded alarm temperature signal condition and the coded reporting period from the second RF module, and to transmit the coded alarm temperature signal condition and the coded reporting period to the first MCU module, and the first MCU module further operates to receive the coded alarm temperature signal condition and the coded reporting period from the first RF module, and to decode the coded alarm temperature signal condition and the coded reporting period whereby obtaining the alarm temperature signal condition and the reporting period thereof.

In a class of this embodiment, the wireless temperature sensor further comprises a power supply module, and a power management module, the power supply module operates to supply power to modules of the wireless temperature sensor, the power management module operates to control the power supply module to supply or to stop supplying power to modules of the wireless temperature sensor, and the first MCU module further operates to detect states of the modules of the wireless temperature sensor, to inform the power management module to control the power supply module to supply power to modules in an operating state, and to inform the power management module to control the power supply module to stop supplying power to modules in an idle state.

In a class of this embodiment, the wireless temperature sensor further comprises a power sensing module, the power sensing module operates to detect whether electric quantity of the power supply module is less than a preset threshold value, and to transmit a warning signal to the first MCU module as electric quantity of the power supply module is less than the preset threshold value, and the first MCU module further operates to receive the warning signal from the power sensing module, and to transmit the warning signal to the communication terminal.

In a class of this embodiment, the wireless temperature sensor further comprises a reset circuit operating to provide a reset signal to the first MCU module once power is on.

In a class of this embodiment, the communication terminal further comprises an input module, a parallel switching module, and an interface module.

In a class of this embodiment, the input module operates to provide a man machine interface, the parallel switching module operates to dynamically switch between parallel circuits output from the communication terminal, and the interface module operates to provide a communication interface.

In a class of this embodiment, it further comprises a computer group.

In a class of this embodiment, the computer group comprises a server and multiple computers, the computer operates to remotely monitor temperature, the server is connected to the communication terminal via the communication interface provided by the interface module, and the server is connected to the computer via a wide area network (WAN) or a local area network (LAN).

Advantages of the invention include: by collecting temperature at the temperature detection point by the wireless temperature sensor, and performing cross-interleaved error correction encoding on the temperature signal, transmission distance of the RF module is increased; one communication terminal is capable of managing up to hundreds of wireless temperature sensor, centralized remote monitoring can be facilitated, no in-situ cable laying is required, installation is simple, extension is convenient, and the invention is not affected by sunshine or illumination.

DETAILED DESCRIPTION OF THE EMBODIMENTS

Further description will be given below in conjunction with accompanying drawings and specific embodiments.

Figure 1:
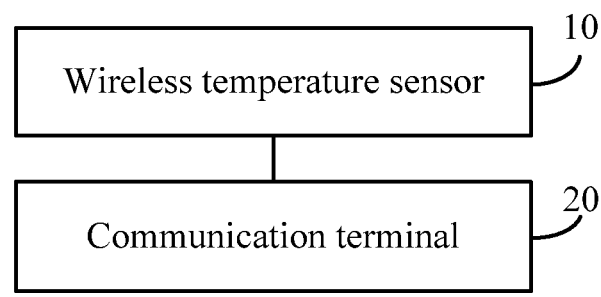
FIG. 1 is a schematic view of a wireless temperature measuring system of a first embodiment of the invention.

As shown in FIG. 1, a wireless temperature measuring system comprises multiple wireless temperature sensors 10, and multiple communication terminals 20. The wireless temperature sensors 10 communicate with the communication terminals 20 via radio frequency (RF).

The wireless temperature sensor 10 operates to obtain temperature signals from a temperature detection point, to perform cross-interleaved error correction encoding on the temperature signals whereby obtaining coded temperature signals, and to transmit the coded temperature signals to the communication terminal 20 via RF.

The communication terminal 20 operates to receive and decode the coded temperature signals from the wireless temperature sensor 10, and to obtain decoded temperature signals.

Figure 2:
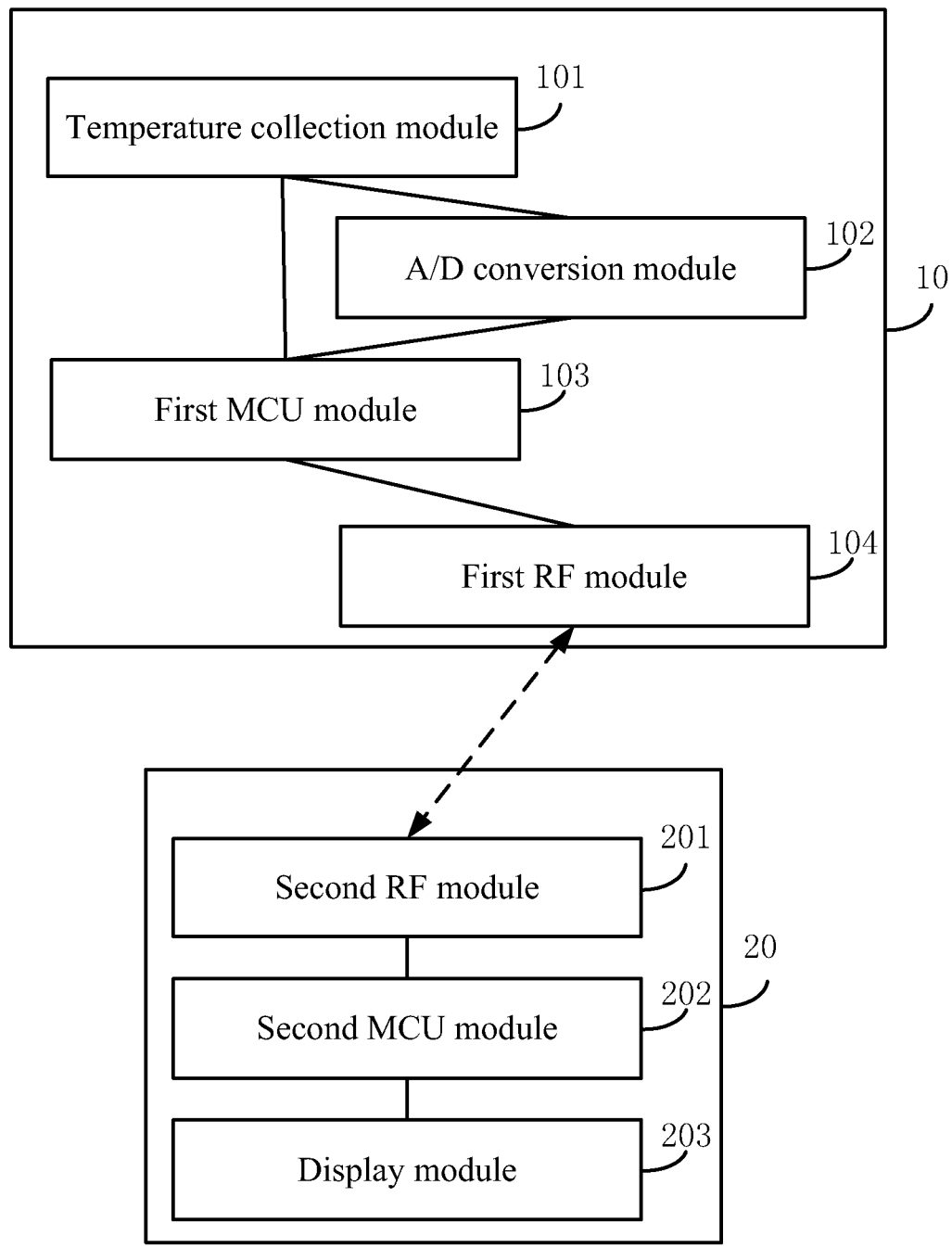
FIG. 2 is a schematic view of a wireless temperature measuring system of a second embodiment of the invention.

As shown in FIG. 2, the wireless temperature sensor 10 comprises a temperature collection module 101, an analog/digital (A/D) conversion module 102, a first microcontroller unit (MCU) module 103, and a first RF module 104.

The temperature collection module 101 operates to collect temperature of the temperature detection point whereby obtaining an analog temperature signal, to transmit the analog temperature signal to the A/D conversion module 102, and to transmit an ID number of the temperature collection module 101 to the first MCU module 103.

Each of the temperature collection modules 101 has a unique ID number. An installation position of a temperature detection point corresponding to a wireless temperature sensor 10 is recorded and saved in the communication terminal 20, so that upon receiving the temperature signal from the wireless temperature sensor 10, the communication terminal 20 can inquiry the installation position of the temperature detection point according to the ID number of the temperature collection module 101.

The A/D conversion module 102 operates to receives the analog temperature signal from the temperature collection module 101, to perform A/D conversion on the analog temperature signal whereby obtaining a digital temperature signal, and to transmit the digital temperature signal to the first MCU module 103.

The first MCU module 103 operates to receive the digital temperature signal from the A/D conversion module 102, and the ID number of the temperature collection module 101 from the temperature collection module 101, to pack the digital temperature signal and the ID number of the temperature collection module 101 with data frames whereby obtaining a temperature signal data packet, to perform cross-interleaved error correction encoding on the temperature signal data packet whereby obtaining a coded temperature signal, and to transmit the coded temperature signal to the first RF module 104.

The cross-interleaved error correction code is capable of correcting a continuous and bursting error of 24 bits, and a coding gain thereof is up to 3 dBm, which is far higher than normal forward error correction, features good anti-interference capacity, sensitivity, error correction capability, and coding efficiency, is capable of filtering erroneous and false information, and thus greatly improving stability during data communication, and increasing transmission distance of the first RF module 104. In areas with middle or small distance shielding, or severe blocking, no routing is required, and the communication terminal 20 is capable of receiving the temperature signal from the first RF module 104, which makes it possible to manage hundreds of wireless temperature sensors 10 via one communication terminal 20. In this manner, only one communication terminal 20 is required to measure temperature and to receive the temperature signal from multiple wireless temperature sensors 10, and no wiring is needed.

The first RF module 104 operates to receive the coded temperature signal from the first RF module 104, and to transmit the coded temperature signal to the communication terminal 20.

As shown in FIG. 2, the communication terminal 20 comprises a second RF module 201, a second MCU module 202, and a display module 203.

The second RF module 201 operates to receive the coded temperature signal from the first RF module 104, and to transmit the coded temperature signal to the second MCU module 202.

The second MCU module 202 operates to receive the coded temperature signal from the second RF module 201, to decode the coded temperature signal whereby obtaining a decoded temperature signal, and to transmit the decoded temperature signal to the display module 203.

The display module 203 operates to receive and to display the decoded temperature signal from the second MCU module 202.

In this embodiment, the display module 203 is a light emitting diode (LED) display, a liquid crystal display (LCD), and so on.

The first MCU module 103 further operate to detect whether a RF signal exists at a main frequency point of the first RF module 104 after receiving the coded temperature signal, to transmit the coded temperature signal to the first RF module 104 and to inform the first RF module 104 to transmit the coded temperature signal via the main frequency point if no RF signal exists at a main frequency point of the first RF module 104, or to transmit the coded temperature signal to the first RF module 104 and to inform the first RF module 104 to transmit the coded temperature signal via an auxiliary frequency point if the RF signal exists at a main frequency point of the first RF module 104.

The main frequency point is a default frequency point for transmitting the coded temperature signal. In this embodiment, the main frequency point is 433 MHz.

As a RF signal exists at the main frequency point, it indicates that other devices transmit signals via the main frequency point. At this time, to prevent same frequency interference, the auxiliary frequency point is used for transmission.

During application, multiple auxiliary frequency points are used, as a RF signal exists at the main frequency point, the auxiliary frequency points are sequentially detected, and those with no RF signal thereat are used for transmitting the coded temperature signal. If RF signals exist at all the auxiliary frequency points, detection is performed from the main frequency point until a frequency point with no RF signal thereat is found. For example, three auxiliary points 433.1 MHz, 433.2 MHz, and 433.3 MHz are used.

The first RF module 104 further operates to transmit the coded temperature signal to the communication terminal 20 via the main frequency point if no RF signal exists at a main frequency point of the first RF module 104, or to transmit the coded temperature signal to the communication terminal 20 via the auxiliary frequency point if the RF signal exists at a main frequency point of the first RF module 104.

The second MCU module 202 further operates to set values of the main frequency point and the auxiliary frequency point, to pack the values of the main frequency point and the auxiliary frequency point with data frames whereby obtaining a frequency point packet, to perform cross-interleaved error correction encoding on the frequency point packet whereby obtaining a coded frequency point, and to transmit the coded frequency point to the second RF module 201. The second RF module 201 further operates to receive the coded frequency point from the second MCU module 202, and to transmit the coded frequency point to the first RF module 104 via RF. The first RF module 104 further operates to receive the coded frequency point from the second RF module 201, and to transmit the coded frequency point to the first MCU module 103.

The first MCU module 103 further operates to receive the coded frequency point from the first RF module 104, to decode the coded frequency point whereby obtaining values of the main frequency point and the auxiliary frequency point, and to set the main frequency point and the auxiliary frequency point of the first RF module 104.

It should be noted that as the second RF module 201 transmits the coded wireless frequency point, a main frequency point and multiple auxiliary frequency points can also be set, like the first RF module 104, and the method is the same as above and will not be described hereinafter.

The first MCU module 103 further operates to detect whether the digital temperature signal matches an alarm temperature signal condition after receiving the digital temperature signal, to pack the digital temperature signal and the ID number of the temperature collection module 101 with data frames whereby obtaining a normal temperature signal packet, to perform cross-interleaved error correction encoding on the normal temperature signal packet whereby obtaining a coded normal temperature signal, and to transmit the coded normal temperature signal to the first RF module 104 if the digital temperature signal does not meet an alarm temperature signal condition, or to pack the digital temperature signal, the ID number of the temperature collection module 101, and a temperature alarm ID with data frames whereby obtaining an alarm temperature signal packet, to perform cross-interleaved error correction encoding on the alarm temperature signal packet whereby obtaining a coded alarm temperature signal, and to transmit the coded alarm temperature signal to the first RF module 104 if the digital temperature signal matches an alarm temperature signal condition.

In this embodiment, multiple temperature alarm modes, such as high temperature alarm, low temperature alarm, temperature rise alarm, temperature reduction alarm, and so on, can be set.

Correspondingly, the alarm temperature signal condition can be set as: sending alarm as the digital temperature signal is higher or lower than a threshold value, or an increment or decrement reaches a threshold value. A reporting period of the temperature signal can be flexibly set, such as 10 minutes, 1 hour and so on. As the temperature signal is normal, the wireless temperature sensor 10 reports temperature at the temperature detection point at the reporting period, such as 10 minutes. As the temperature signal is abnormal, the wireless temperature sensor 10 transmits the temperature signal to the communication terminal 20 in real-time.

The first RF module 104 further operates to receive the coded normal temperature signal from the first MCU module 103, and to transmit the coded normal temperature signal to the communication terminal 20 via RF if the digital temperature signal does not meet an alarm temperature signal condition, or to receive the coded alarm temperature signal from the first MCU module 103, and to transmit the coded alarm temperature signal to the communication terminal 20 via RF if the digital temperature signal matches an alarm temperature signal condition.

Figure 3:
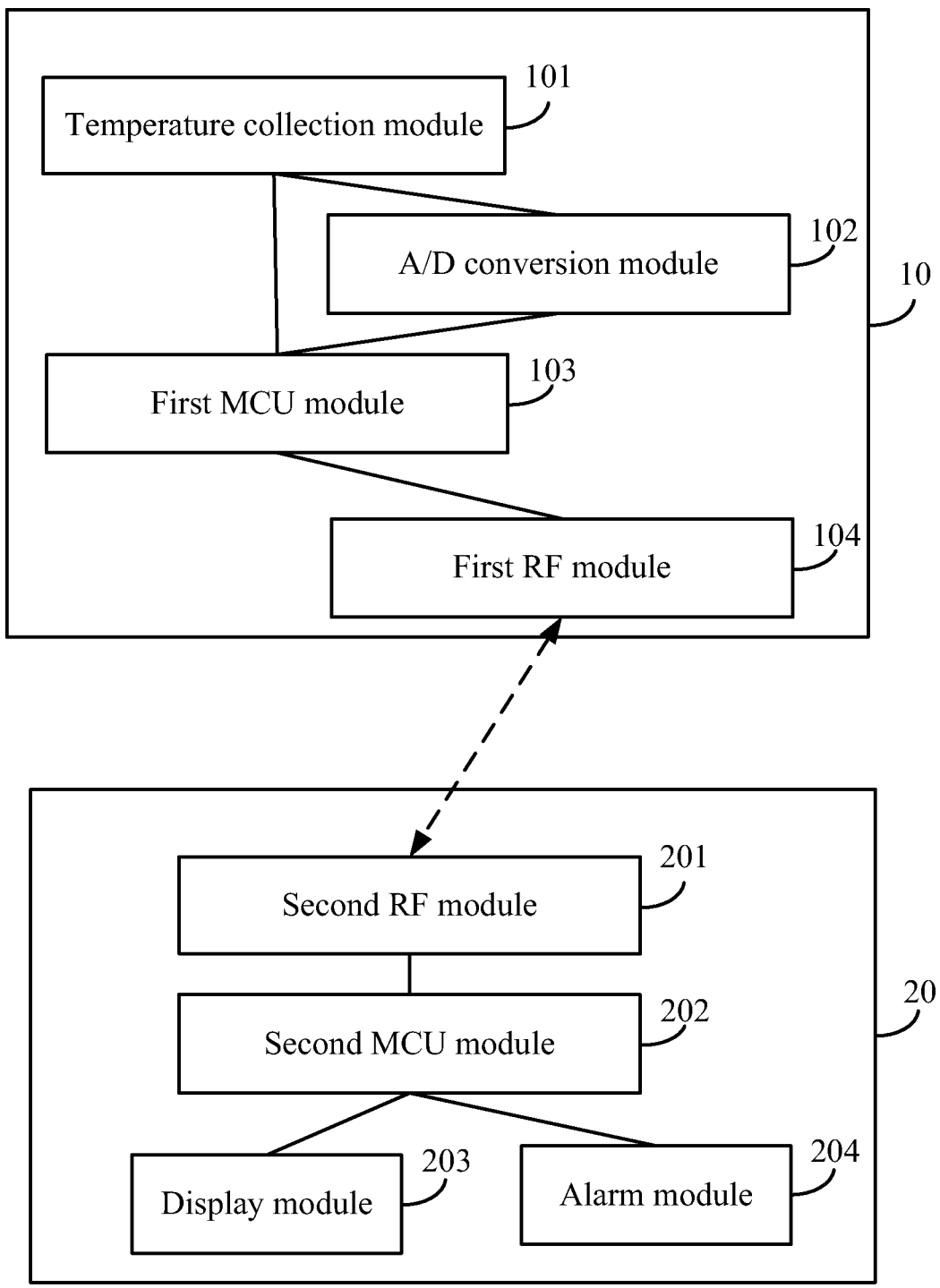
FIG. 3 is a schematic view of a wireless temperature measuring system of a third embodiment of the invention.

As shown in FIG. 3, the communication terminal 20 further comprises an alarm module 204.

The second RF module 201 further operates to receive the normal temperature signal from the first RF module 104, and to transmit the normal temperature signal to the second MCU module 202 if the digital temperature signal does not meet an alarm temperature signal condition, or to receive the alarm temperature signal from the first RF module 104, and to transmit the alarm temperature signal to the second MCU module 202 if the digital temperature signal matches an alarm temperature signal condition.

The second MCU module 202 further operates to receive the normal temperature signal from the second RF module 201, to decode the normal temperature signal whereby obtaining a decoded normal temperature signal, and to transmit the decoded normal temperature signal to the display module 203 if the digital temperature signal does not meet an alarm temperature signal condition, or to receive the alarm temperature signal from the second RF module 201, to decode the alarm temperature signal whereby obtaining a decoded alarm temperature signal, to transmit the decoded alarm temperature signal to the display module 203, and to inform the alarm module 204 to send an alarm if the digital temperature signal matches an alarm temperature signal condition.

In this embodiment, the alarm comprises audible and visual alarm, and buzz alarm.

The display module 203 further operates to receive and to display the decoded normal temperature signal from the second MCU module 202 if the digital temperature signal does not meet an alarm temperature signal condition, or to receive and to display the decoded alarm temperature signal from the second MCU module 202 if the digital temperature signal matches an alarm temperature signal condition.

The second MCU module 202 further operates to set the alarm temperature signal condition and a reporting period thereof, to pack the alarm temperature signal condition and the reporting period thereof with data frames whereby obtaining an alarm temperature signal condition packet, and a reporting period packet, to perform cross-interleaved error correction encoding on the alarm temperature signal condition packet and the reporting period packet whereby obtaining a coded alarm temperature signal condition and a coded reporting period, and to transmit the coded alarm temperature signal condition and the coded reporting period to the second RF module 201.

The second RF module 201 further operates to receive the coded alarm temperature signal condition and the coded reporting period from the second MCU module 202, and to transmit the coded alarm temperature signal condition and the coded reporting period to the first RF module 104.

The first RF module 104 further operates to receive the coded alarm temperature signal condition and the coded reporting period from the second RF module 201, and to transmit the coded alarm temperature signal condition and the coded reporting period to the first MCU module 103.

The first MCU module 103 further operates to receive the coded alarm temperature signal condition and the coded reporting period from the first RF module 104, and to decode the coded alarm temperature signal condition and the coded reporting period whereby obtaining the alarm temperature signal condition and the reporting period thereof.

It should be noted that as the second RF module 201 transmits the coded alarm temperature signal condition and the coded reporting period, a main frequency point and multiple auxiliary frequency points can also be set, like the first RF module 104, and the method is the same as above and will not be described hereinafter.

Figure 4:
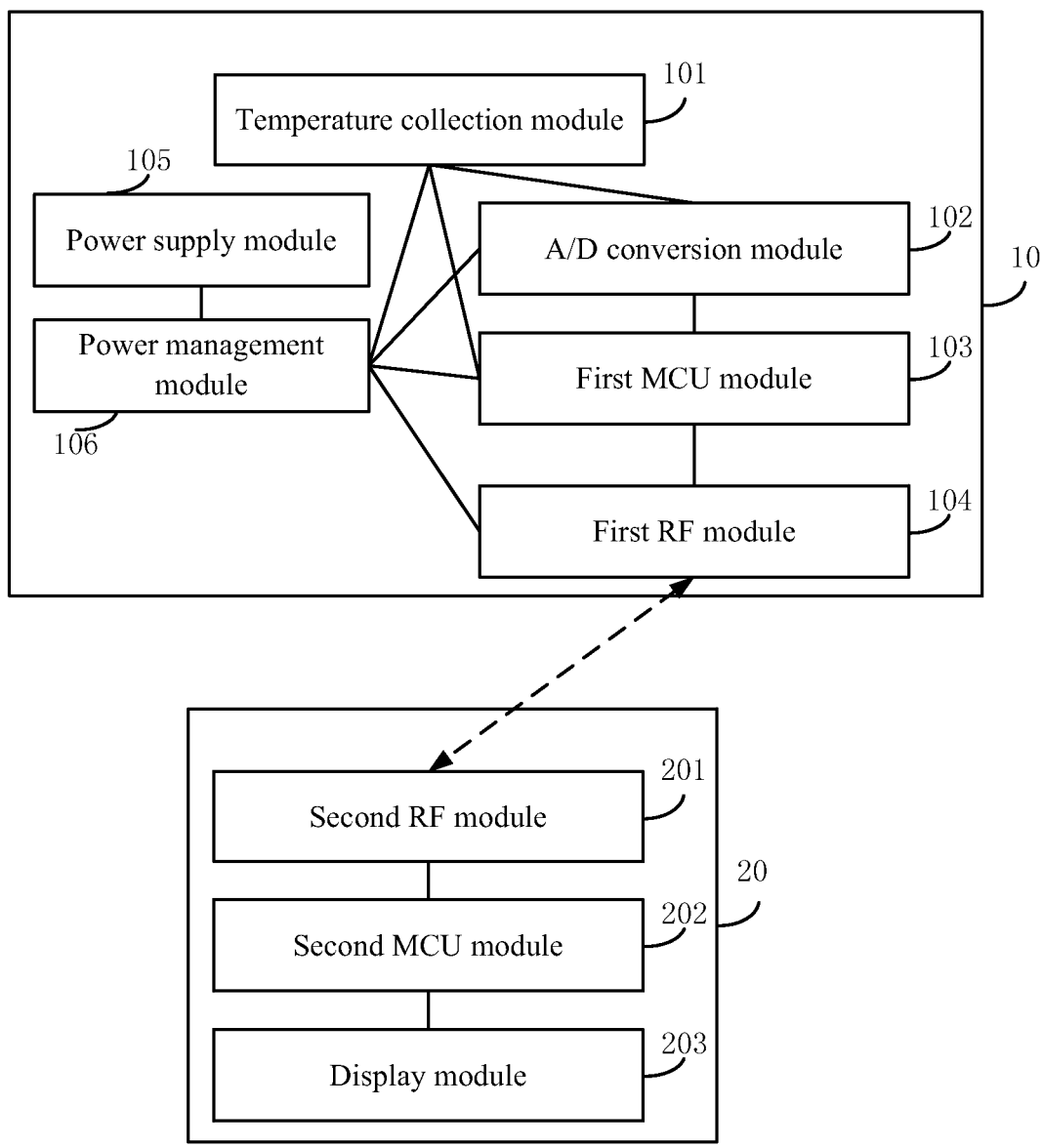
FIG. 4 is a schematic view of a wireless temperature measuring system of a fourth embodiment of the invention.

As shown in FIG. 4, the wireless temperature sensor 10 further comprises a power supply module 105, and a power management module 106.

The power supply module 105 operates to supply power to modules of the wireless temperature sensor 10. In this embodiment, the power supply module 105 is a battery module, and any type of batteries can be used.

The power management module 106 operates to control the power supply module 105 to supply or to stop supplying power to modules of the wireless temperature sensor 10.

The first MCU module 103 further operates to detect states of the modules of the wireless temperature sensor 10, to inform the power management module 106 to control the power supply module 105 to supply power to modules in an operating state, and to inform the power management module 106 to control the power supply module 105 to stop supplying power to modules in an idle state.

For example, as the wireless temperature sensor 10 comprises the temperature collection module 101, the A/D conversion module 102, the first MCU module 103, and the first RF module 104, the first MCU module 103 detects states of itself, the temperature collection module 101, the A/D conversion module 102, and the first RF module 104. As the temperature collection module 101, the A/D conversion module 102, the first MCU module 103, or the first RF module 104 is in an operating state, the first MCU module 103 informs the power management module 106 to control the power supply module 105 to supply power to the temperature collection module 101, the A/D conversion module 102, the first MCU module 103, or the first RF module 104. As temperature collection module 101, the A/D conversion module 102, the first MCU module 103, or the first RF module 104 is in an idle state, the first MCU module 103 informs the power management module 106 to control the power supply module 105 to stop supplying power to the temperature collection module 101, the A/D conversion module 102, the first MCU module 103, or the first RF module 104.

It should be noted that the above-mentioned method greatly increases work life of the power supply module 105. Experiments indicate that as the reporting period is 30 minutes, a work life of a 1800 mAh battery can be used for 8 to 10 years.

Figure 5:
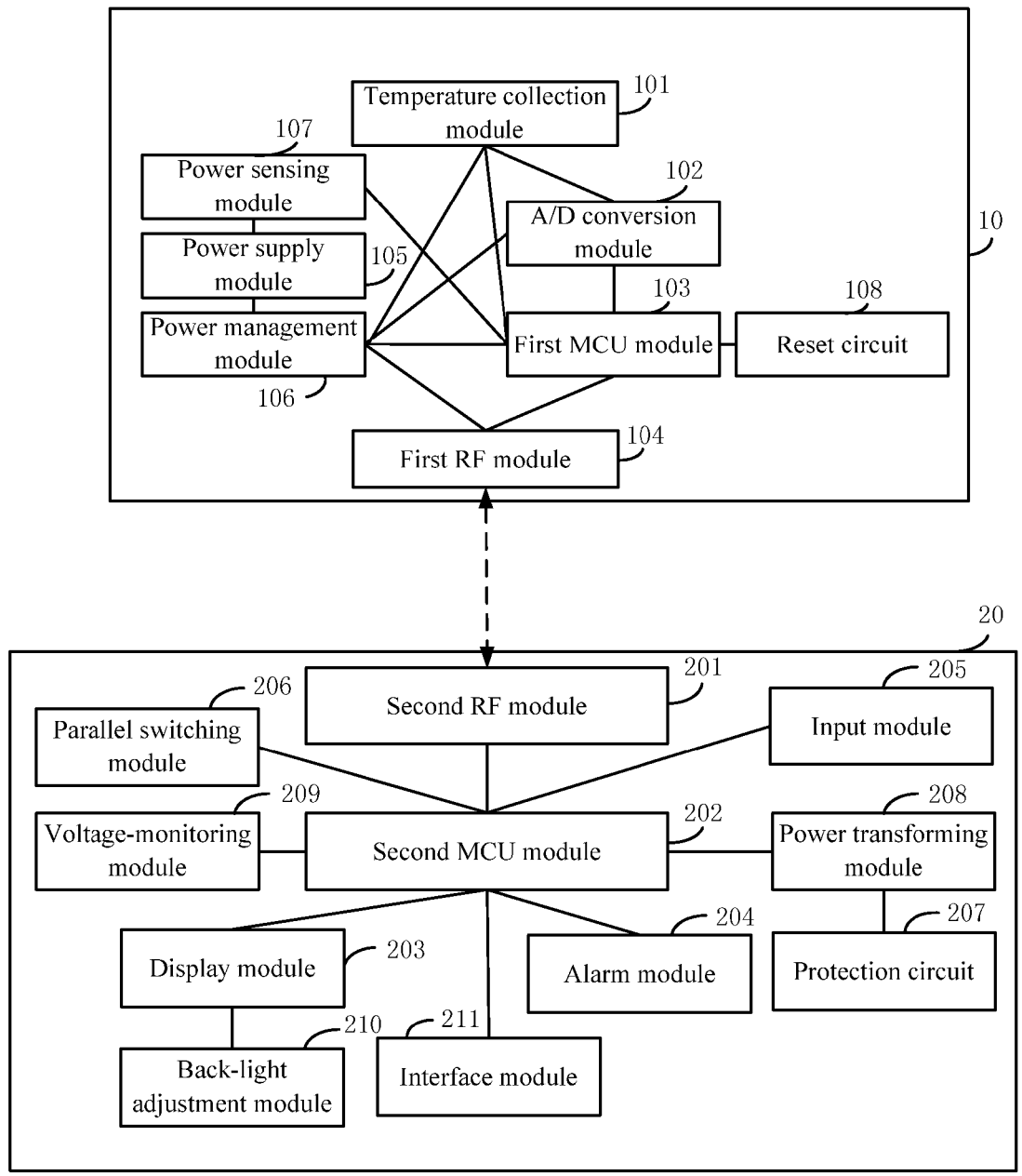
FIG. 5 is a schematic view of a wireless temperature measuring system of a fifth embodiment of the invention.

As shown in FIG. 5, the wireless temperature sensor 10 further comprises a power sensing module 107.

The power sensing module 107 operates to detect whether electric quantity of the power supply module 105 is less than a preset threshold value, and to transmit a warning signal to the first MCU module 103 as electric quantity of the power supply module 105 is less than the preset threshold.

The first MCU module 103 further operates to receive the warning signal from the power sensing module 107, and to transmit the warning signal to the communication terminal 20.

As the communication terminal 20 receives the warning signal, the alarm module 204 as shown in FIG. 3 sends an alarm or the display module 203 display the warning signal whereby informing a user to change a battery.

As shown in FIG. 5, the wireless temperature sensor 10 further comprises a reset circuit 108.

The communication terminal 20 further comprises an input module 205, a parallel switching module 206, a protection circuit 207, a power transforming module 208, a voltage-monitoring module 209, a back-light adjustment module 210, and an interface module 211.

The reset circuit 108 operates to provide a reset signal to the first MCU module 103 once power is on whereby ensuring reliable operation thereof.

The input module 205 operates to provide a man machine interface. In this embodiment, the input module 205 is a keyboard, a touch screen and so on. As a user inputs control information via the input module 205, remote control of the wireless temperature sensor 10 is facilitated.

The parallel switching module 206 operates to dynamically switch between parallel circuits output from the communication terminal 20. For example, the parallel switching module 206 is capable of switching from a parallel circuit to a RS-232 communication interface or a RS-485 communication interface. The RS-232 communication interface provides a program updating interface, and the RS-485 communication interface provides a communication interface.

The protection circuit 207 operates to switch off a power supply as power supplied to the second MCU module 202 is higher than a threshold power value. This makes the invention applicable to severe industrial environment, and effectively protects the invention against thunder and light, over-voltage, over-current, and so on.

The power transforming module 208 operates to transform power supplied to the second MCU module 202 by the protection circuit 207 into power that the second MCU module 202 needs.

The voltage-monitoring module 209 operates to monitor power voltage of the second MCU module 202, and to provide a reset signal to the second MCU module 202 as the power voltage drops.

The back-light adjustment module 210 operates to adjust back light of the display module 203.

The interface module 211 operates to provide a communication interface. In this embodiment, the communication interface comprises a general packet radio service (GPRS)

interface, a code division multiple access (CDMA) interface, a RS-485 bus, an Ethernet interface, a fiber interface, and so on.

Figure 6:
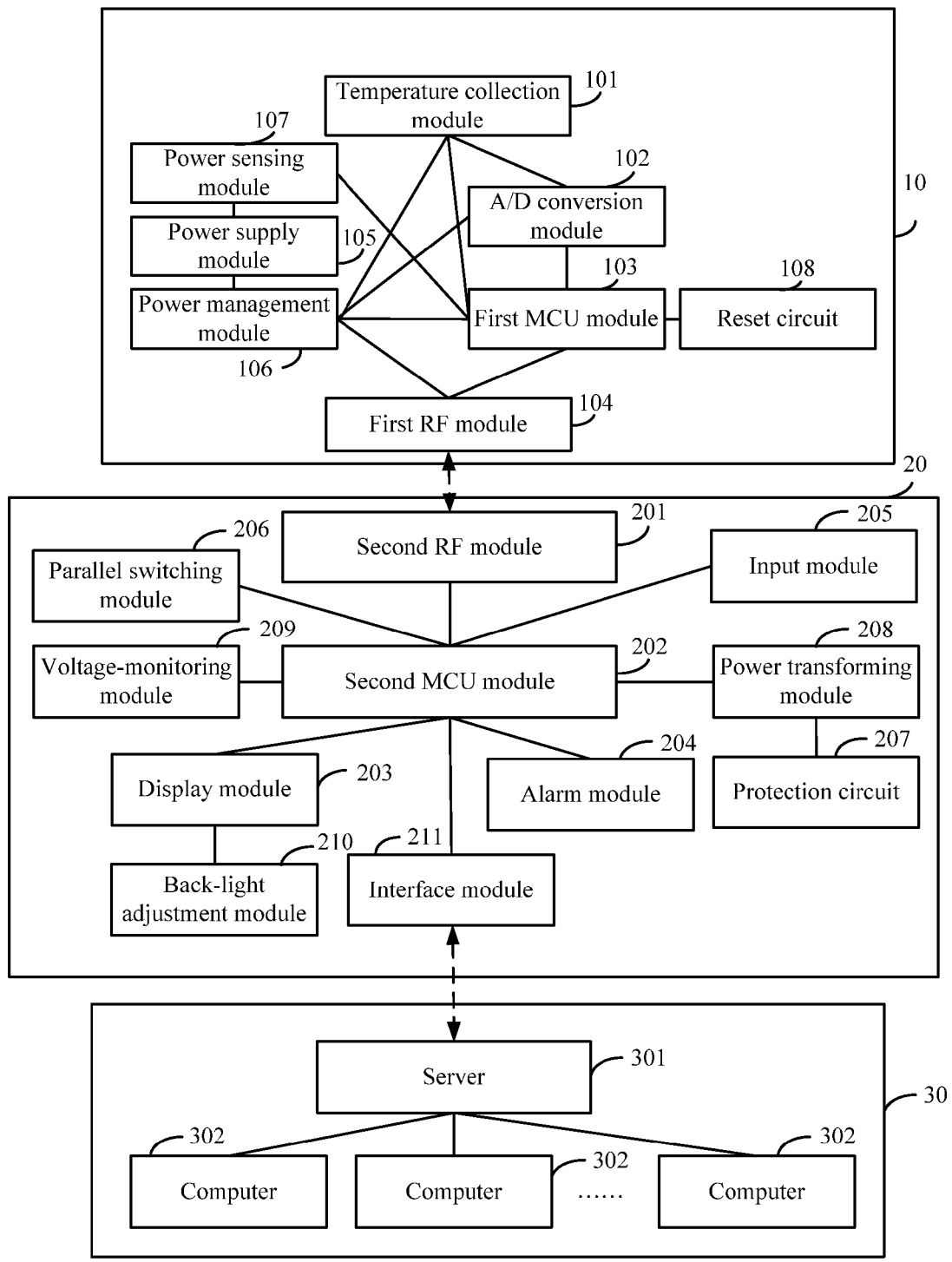
FIG. 6 is a schematic view of a wireless temperature measuring system of a sixth embodiment of the invention.

As shown in FIG. 6, the wireless temperature measuring further comprises a computer group 30.

The computer group 30 comprises a server 301 and multiple computers 302.

The computer 302 operates to remotely monitor temperature.

The server 301 is connected to the communication terminal 20 via the communication interface provided by the interface module 211, and to the computer 302 via a wide area network (WAN) or a local area network (LAN).

In details, the server 301 obtains temperature data at all temperature detection points from the communication terminal 20, saves the temperature data in database, displays a temperature variation curve of the temperature detection point, and can access a web for web publishing. The computer 302 visits the server 301 via the Internet Explorer. The communication terminal 20 can be an economical receiver, an intelligent receiver or other equivalent devices.

The server 301 is capable of displaying real-time temperature data and highest temperature data, inquiring history data in a certain time period, drawing curves, and graphically indicating variation of state variables. The server 301 can adjust temperature alarm threshold value and measuring time of the wireless temperature sensor 10, and provide a wireless WEB-based temperature inquiry system during WEB publishing. Temperature data are published on the server 301. All computers in the computer group 30 can enter the inquiry system with allocated authority and passwords whereby implementing data inquiry, analysis of a temperature trend curve, real-time monitoring of electric maps, device management, staff authority management, and so on.

The server 301 sets functional parameters of the wireless temperature sensor 10, such as values of the main frequency point and the auxiliary frequency point, the alarm temperature signal condition, the reporting period of the temperature signal, and so on, to the wireless temperature sensor 10 via the communication terminal 20.

The wireless temperature measuring system of the invention can be applied to industry, military, electric power and so on. As the invention is applied to a power system, the temperature detection point is disposed at a joint of cables that easily get hot, or at surface of transformers and switches. The communication terminal 20 is disposed in a central control room whereby receiving temperature data from the wireless temperature sensor 10, or connected to the server 301 of the computer group 30 via buses whereby uploading temperature data thereto and responding to various commands therefrom. Multiple computers 302 can log on the server 301 to obtain temperature information, and set setting control commands according different authority.

Figure 7:
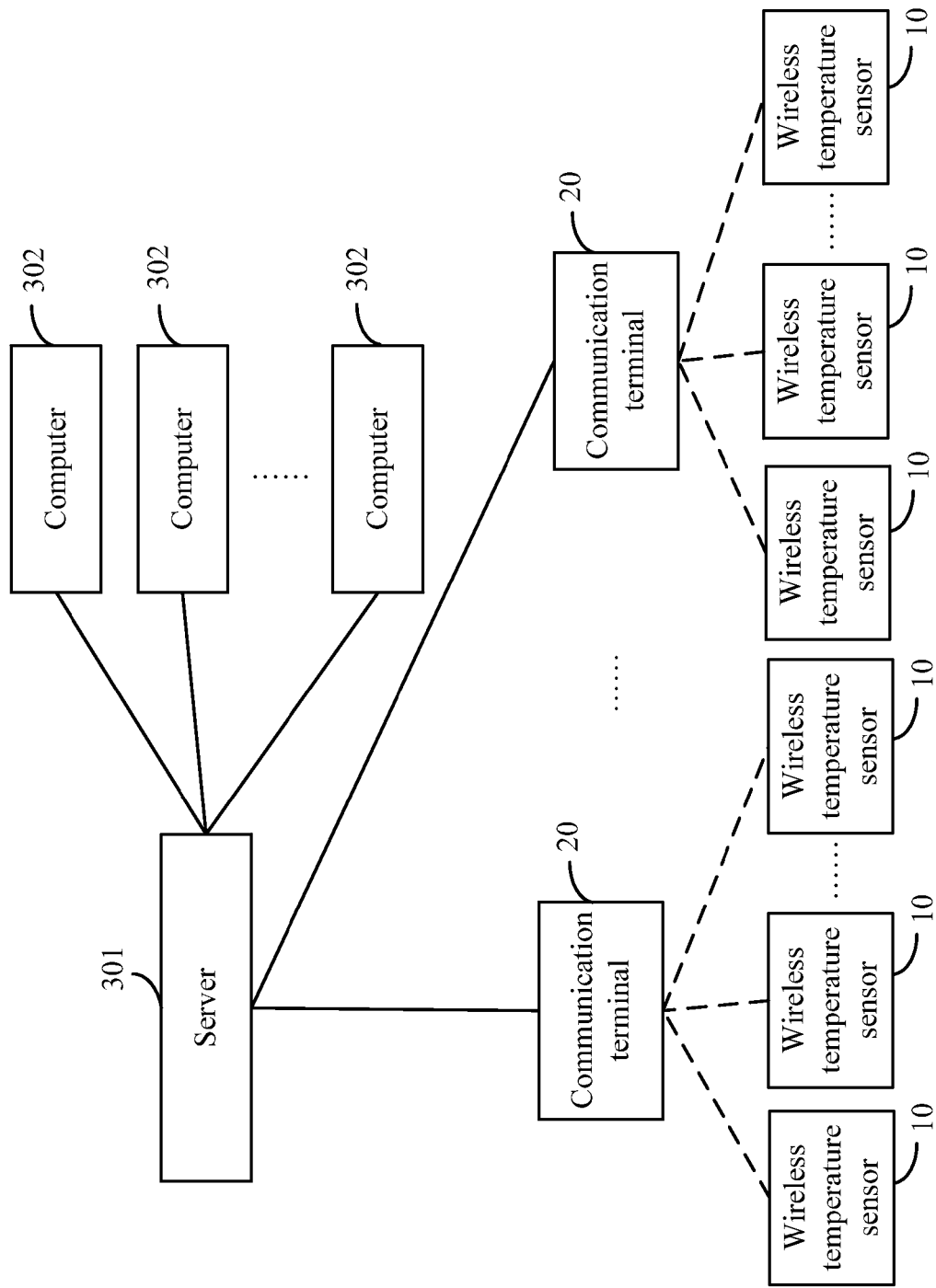
FIG. 7 illustrates application of a wireless temperature measuring system in remote and real-time monitoring in room temperature.

As shown in FIG. 7, as the invention is applied to remote and real-time monitoring in room temperature, the wireless temperature sensor 10 is randomly disposed in a user's home. As the wireless temperature sensor 10 collects temperature data, data are transmitted via RF. Every wireless temperature sensor 10 has a unique ID number, and all the wireless temperature sensors 10 transmit data in a manner of automatic routing and relay. The communication terminal 20 or the computer group 30 adjusts transmission time and period of the temperature signal and alarm temperature threshold thereof of the wireless temperature sensor 10, whereby implementing bi-directional communication. The wireless temperature sensor 10 employs low power consumption design, power is supplied thereto via batteries, and work life of the batteries is 8 to 10 years. The wireless temperature sensor 10 automatically transmits temperature data in a certain time interval, and sends alarm as temperature is abnormal without limitation of transmission time. Then the communication terminal 20 receives the temperature data from wireless temperature sensor 10 via RF and the display module (such as LED) the temperature data. A user is capable of setting parameters of the wireless temperature sensor 10 via the input module 205. The communication interface of the communication terminal 20 communicates with the server 301 via a RS-485 bus, a GPRS interface, an Ethernet interface, a fiber interface, and so on. Background software of the wireless temperature measuring system is installed on the server 301, whereby implementing monitoring of real-time temperature, highest temperature, lowest temperature, average temperature and so on, intelligently analyzing the temperature data according to preset time interval or inquiry condition in a manner of a bar chart or a trend curve, and setting a sampling interval and various alarm threshold values (comprising increment or decrement of temperature, absolute temperature, and so on). Software of the invention publishes database on the server 301 via WEB publishing, so that authorized computers in the LAN can browse the temperature data and relevant graphs, and remotely change various parameters.

All or part of the content of the invention can be facilitated by software programming, and relevant software programs are saved in readable storage mediums, such as hard disks, CDs, or floppy disks.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A wireless temperature measuring system, comprising:
multiple wireless temperature sensors; and
multiple communication terminals;
wherein
said wireless temperature sensors communicate with said communication terminals via radio frequency (RF);
said wireless temperature sensors operate to obtain temperature signals from a temperature detection point, to perform cross-interleaved error correction encoding on said temperature signals whereby obtaining coded temperature signals, and to transmit said coded temperature signals to said communication terminals via RF;
said communication terminals operate to receive and decode said coded temperature signals from said wireless temperature sensors, and to obtain decoded temperature signals;
each of said wireless temperature sensors comprises a temperature collection module, an analog/digital (A/D) conversion module, a first micro-controller unit (MCU) module, and a first RF module;
said temperature collection module operates to collect temperature of said temperature detection point whereby obtaining an analog temperature signal, to transmit said analog temperature signal to said A/D conversion module, and to transmit an ID number of said temperature collection module to said first MCU module;

said A/D conversion module operates to receive said analog temperature signal from said temperature collection module, to perform A/D conversion on said analog temperature signal whereby obtaining a digital temperature signal, and to transmit said digital temperature signal to said first MCU module;

said first MCU module operates to receive said digital temperature signal from said A/D conversion module, and said ID number of said temperature collection module from said temperature collection module, to pack said digital temperature signal and said ID number of said temperature collection module with data frames whereby obtaining a temperature signal data packet, to perform cross-interleaved error correction encoding on said temperature signal data packet whereby obtaining a coded temperature signal, and to transmit said coded temperature signal to said first RF module;

said first RF module operates to receive said coded temperature signal from said first MCU module, and to transmit said coded temperature signal to said communication terminal;

each of said multiple communication terminals comprises a second RF module, a second MCU module, and a display module;

said second RF module operates to receive said coded temperature signal from said first RF module, and to transmit said coded temperature signal to said second MCU module;

said second MCU module operates to receive said coded temperature signal from said second RF module, to decode said coded temperature signal whereby obtaining a decoded temperature signal, and to transmit said decoded temperature signal to said display module;

said display module operates to receive and to display said decoded temperature signal from said second MCU module;

said first MCU module further operates to detect whether an RF signal exists at a main frequency point of said first RF module after receiving said coded temperature signal, to transmit said coded temperature signal to said first RF module and to inform said first RF module to transmit said coded temperature signal via said main frequency point if no RF signal exists at a main frequency point of said first RF module, or to transmit said coded temperature signal to said first RF module and to inform said first RF module to transmit said coded temperature signal via an auxiliary frequency point if said RF signal exists at a main frequency point of said first RF module;

said second MCU module further operates to set values of said main frequency point and said auxiliary frequency point, to pack said values of said main frequency point and said auxiliary frequency point with data frames whereby obtaining a frequency point packet, to perform cross-interleaved error correction encoding on said frequency point packet whereby obtaining a coded frequency point, and to transmit said coded frequency point to said second RF module;

said second RF module further operates to receive said coded frequency point from said second MCU module, and to transmit said coded frequency point to said first RF module via RF;

said first RF module further operates to receive said coded frequency point from said second RF module, and to transmit said coded frequency point to said first MCU module; and said first MCU module further operates to receive said coded frequency point from said first RF module, to decode said coded frequency point whereby obtaining values of said main frequency point and said auxiliary frequency point, and to set said main frequency point and said auxiliary frequency point of said first RF module.

2. A wireless temperature measuring system, comprising:
multiple wireless temperature sensors; and
multiple communication terminals;
wherein
said wireless temperature sensors communicate with said communication terminals via radio frequency (RF);

said wireless temperature sensors operate to obtain temperature signals from a temperature detection point, to perform cross-interleaved error correction encoding on said temperature signals whereby obtaining coded temperature signals, and to transmit said coded temperature signals to said communication terminals via RF;

said communication terminals operate to receive and decode said coded temperature signals from said wireless temperature sensors, and to obtain decoded temperature signals;

each of said wireless temperature sensors comprises a temperature collection module, an analog/digital (A/D) conversion module, a first micro-controller unit (MCU) module, and a first RF module;

said temperature collection module operates to collect temperature of said temperature detection point whereby obtaining an analog temperature signal, to transmit said analog temperature signal to said A/D conversion module, and to transmit an ID number of said temperature collection module to said first MCU module;

said A/D conversion module operates to receive said analog temperature signal from said temperature collection module, to perform A/D conversion on said analog temperature signal whereby obtaining a digital temperature signal, and to transmit said digital temperature signal to said first MCU module;

said first MCU module operates to receive said digital temperature signal from said A/D conversion module, and said ID number of said temperature collection module from said temperature collection module, to pack said digital temperature signal and said ID number of said temperature collection module with data frames whereby obtaining a temperature signal data packet, to perform cross-interleaved error correction encoding on said temperature signal data packet whereby obtaining a coded temperature signal, and to transmit said coded temperature signal to said first RF module;

said first RF module operates to receive said coded temperature signal from said first MCU module, and to transmit said coded temperature signal to said communication terminal;

each of said communication terminals comprises a second RF module, a second MCU module, and a display module;

said first MCU module further operates to detect whether said digital temperature signal matches an alarm temperature signal condition after receiving said digital temperature signal, to pack said digital temperature signal and said ID number of said temperature collection module with data frames whereby obtaining a normal temperature signal packet, to perform cross-interleaved error correction encoding on said normal temperature signal packet whereby obtaining a coded normal temperature signal, and to transmit said coded normal temperature signal to said first RF module if said digital temperature signal does not meet an alarm temperature signal condition, or to pack said digital temperature signal, said ID number of said temperature collection module, and a temperature alarm ID with data frames whereby obtaining an alarm temperature signal packet, to perform cross-interleaved error correction encoding on said alarm temperature signal packet whereby obtaining a coded alarm temperature signal, and to transmit said coded alarm temperature signal to said first RF module if said digital temperature signal matches an alarm temperature signal condition;

said first RF module further operates to receive said coded normal temperature signal from said first MCU module, and to transmit said coded normal temperature signal to said communication terminal via RF if said digital temperature signal does not meet an alarm temperature signal condition, or to receive said coded alarm temperature signal from said first MCU module, and to transmit said coded alarm temperature signal to said communication terminal via RF if said digital temperature signal matches an alarm temperature signal condition;

each communication terminal further comprises an alarm module;

said second RF module further operates to receive said normal temperature signal from said first RF module, and to transmit said normal temperature signal to said second MCU module if said digital temperature signal does not meet an alarm temperature signal condition, or to receive said alarm temperature signal from said first RF module, and to transmit said alarm temperature signal to said second MCU module if said digital temperature signal matches an alarm temperature signal condition;

said second MCU module further operates to receive said normal temperature signal from said second RF module, to decode said normal temperature signal whereby obtaining a decoded normal temperature signal, and to transmit said decoded normal temperature signal to said display module if said digital temperature signal does not meet an alarm temperature signal condition, or to receive said alarm temperature signal from said second RF module, to decode said alarm temperature signal whereby obtaining a decoded alarm temperature signal, to transmit said decoded alarm temperature signal to said display module, and to inform said alarm module to send an alarm if said digital temperature signal matches an alarm temperature signal condition;

said display module further operates to receive and to display said decoded normal temperature signal from said second MCU module if said digital temperature signal does not meet an alarm temperature signal condition, or to receive and to display said decoded alarm temperature signal from said second MCU module if said digital temperature signal matches an alarm temperature signal condition;

said second MCU module further operates to set said alarm temperature signal condition and a reporting period thereof, to pack said alarm temperature signal condition and said reporting period thereof with data frames whereby obtaining an alarm temperature signal condition packet, and a reporting period packet, to perform cross-interleaved error correction encoding on said alarm temperature signal condition packet and said reporting period packet whereby obtaining a coded alarm temperature signal condition and a coded reporting period, and to transmit said coded alarm temperature signal condition and said coded reporting period to said second RF module;

said second RF module further operates to receive said coded alarm temperature signal condition and said coded reporting period from said second MCU module, and to transmit said coded alarm temperature signal condition and said coded reporting period to said first RF module;

said first RF module further operates to receive said coded alarm temperature signal condition and said coded reporting period from said second RF module, and to transmit said coded alarm temperature signal condition and said coded reporting period to said first MCU module; and said first MCU module further operates to receive said coded alarm temperature signal condition and said coded reporting period from said first RF module, and to decode said coded alarm temperature signal condition and said coded reporting period whereby obtaining said alarm temperature signal condition and said reporting period thereof.

* * * * *